(12) United States Patent
Davis et al.

(10) Patent No.: US 9,848,240 B2
(45) Date of Patent: *Dec. 19, 2017

(54) ASSESSING DIGITAL CONTENT ACROSS A COMMUNICATIONS NETWORK

(71) Applicant: IPOWOW! DEVELOPMENT PTY LTD, Waverley, New South Wales (AU)

(72) Inventors: Gary Samuel Davis, Vacucluse (AU); Eric Joseph Gyors, Maroubra (AU); Peter David Tippett, Bondi Junction (AU)

(73) Assignee: IPOWOW INTERNATIONAL CORP., Vancouver, B.C. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,056

(22) Filed: Oct. 12, 2016

(65) Prior Publication Data

US 2017/0034577 A1    Feb. 2, 2017

Related U.S. Application Data

(63) Continuation of application No. 14/823,391, filed on Aug. 11, 2015, now Pat. No. 9,491,509, which is a
(Continued)

(51) Int. Cl.
*H04N 21/442* (2011.01)
*H04N 21/643* (2011.01)
(Continued)

(52) U.S. Cl.
CPC ....... *H04N 21/44222* (2013.01); *G06Q 30/02* (2013.01); *H04N 21/242* (2013.01);
(Continued)

(58) Field of Classification Search
CPC .............. G06Q 30/02; H04N 21/4756; H04N 21/44222; H04N 21/242; H04N 21/252; H04N 21/64322
(Continued)

(56) References Cited

U.S. PATENT DOCUMENTS 8,327,395 B2 * 12/2012 Lee .................. G06Q 30/02
                                                              725/10
8,897,737 B2    11/2014 Hahn et al.
(Continued)

FOREIGN PATENT DOCUMENTS

GB    2397205 A    7/2004
GB    2452519 A    3/2009
(Continued)

OTHER PUBLICATIONS

Google Inc., Youtube.com/youchoose,May 1, 2008, Wayback Machine, Non-Patent-Literature (NPL).
(Continued)

*Primary Examiner* — Andrew Lai
*Assistant Examiner* — Hoyet H Andrews, III
(74) *Attorney, Agent, or Firm* — Miles & Stockbridge P.C.

(57) ABSTRACT

The present invention relates generally to a method of providing an on-line assessment of digital content, such as video clips (10), across a network, such as the Internet. In general terms the steps involved in this embodiment of the methodology include: 1. presenting a stimulant video clip (10); 2. providing means for rating the video clip in real time, in this example a rating bar (12) and slider (14) driven by a computer peripheral device (not shown); 3. collecting rating data relevant to the viewed video clip such as (10).

20 Claims, 6 Drawing Sheets

Related U.S. Application Data continuation of application No. 13/766,772, filed on Feb. 13, 2013, now abandoned, which is a continuation of application No. 12/999,951, filed as application No. PCT/AU2009/000785 on Jun. 18, 2006, now abandoned.

(60) Provisional application No. 61/073,601, filed on Jun. 18, 2008.

(51) Int. Cl.
*H04N 21/25* (2011.01)
*H04N 21/242* (2011.01)
*G06Q 30/02* (2012.01)
*H04N 21/475* (2011.01)

(52) U.S. Cl.
CPC ....... *H04N 21/252* (2013.01); *H04N 21/4756* (2013.01); *H04N 21/64322* (2013.01)

(58) Field of Classification Search
USPC ............... 709/217; 705/7.33, 1; 715/747
See application file for complete search history.

(56) References Cited

U.S. PATENT DOCUMENTS

| 9,491,509 | B2* | 11/2016 | Davis | G06Q 30/02 |
| 2004/0216157 | A1* | 10/2004 | Shain | G06Q 30/02 725/42 |
| 2005/0001903 | A1* | 1/2005 | Endler | G06F 17/30867 348/207.1 |
| 2006/0090131 | A1* | 4/2006 | Kumagai | G06Q 30/02 715/700 |
| 2007/0157221 | A1* | 7/2007 | Ou | H04H 60/31 725/10 |
| 2007/0206606 | A1* | 9/2007 | Coleman | G06Q 30/02 370/395.52 |
| 2008/0098417 | A1* | 4/2008 | Hatamian | H04H 60/33 725/24 |
| 2009/0089294 | A1* | 4/2009 | Davis | H04N 7/17318 |
| 2009/0254359 | A1* | 10/2009 | Bandy | G06Q 10/06 705/7.33 |
| 2011/0022966 | A1* | 1/2011 | Rose | G06F 17/3089 715/747 |
| 2015/0350732 | A1* | 12/2015 | Davis | G06Q 30/02 725/13 |

FOREIGN PATENT DOCUMENTS

WO  WO 03/083752  10/2003
WO  WO 2007/140414 A2  12/2007

OTHER PUBLICATIONS

Digg Inc., dig.com/videos/2008_us_elections, Dec. 8, 2007, Wayback Machine, Non-Patent-Literature (NPL).
Extended European Search Report dated Apr. 10, 2012, in European Application No. 09765265.5.
Digg Inc, digg.com/videos/2008_us-elections, Dec. 8, 2007, Wayback Machine, non-Patent_Literature (NPL).

* cited by examiner

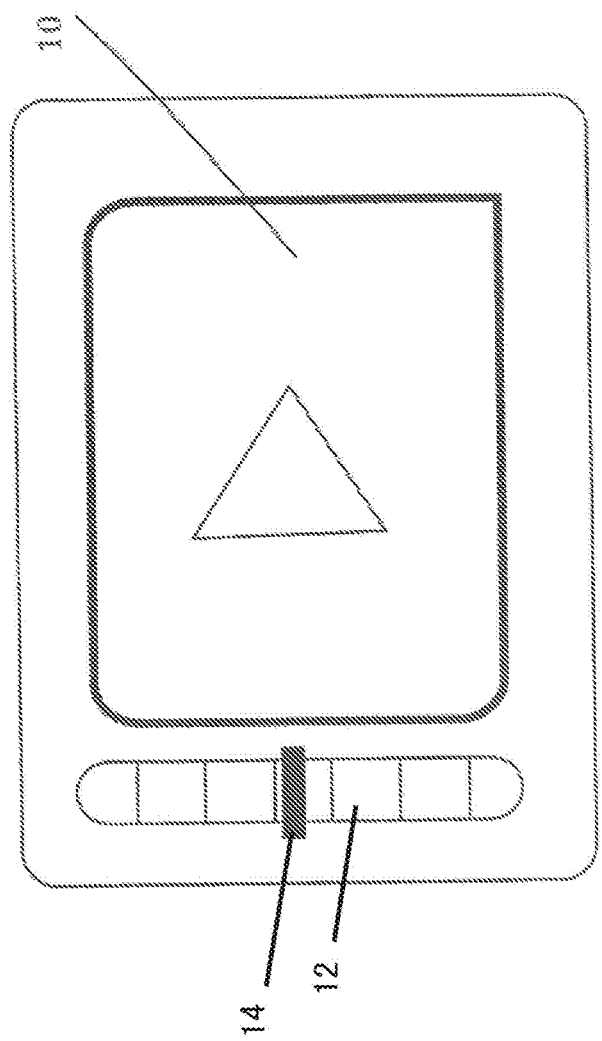

ASSESSING DIGITAL CONTENT ACROSS A COMMUNICATIONS NETWORK

FIELD OF THE INVENTION

The present invention relates broadly to an on-line method of assessing digital content across a network and relates particularly, although not exclusively, to the assessment or rating of video clips on the Internet. The invention also relates to a method of broadcasting and presenting digital content across a communications network.

BACKGROUND TO THE INVENTION

YouTube (trademark of Google Inc.) is a video sharing website where users can upload, view and share video clips. It is also possible for registered users to post their own video responses. YouTube allows for viewers who have logged on to view and then rate video clips on a 5 star rating scale.

SUMMARY OF THE INVENTION

According to one aspect of the present invention there is provided an on-line method of assessing digital content across a communications network, said method comprising the steps of:
  presenting digital content at a node of the network;
  providing means for real-time rating of the digital content as it is viewed at the network node;
  collecting rating data from multiple viewers relevant to the viewed digital content,
  time-stamping the collected rating data from each of the multiple viewers at the network node to coincide with and thus be synchronised within the digital content.

Preferably the step of presenting digital content involves presenting two or more video clips relevant to a specified topic at a computer connected to the Internet. Alternatively the step of presenting digital content involves presenting a single video clip only. More preferably the step of providing means for real-time rating of the digital content involves the provision of an external peripheral device associated with the computer and operable to allow viewer rating of each of the video clips in real time and at no charge. Generally the peripheral device includes a keyboard, touchpad, keypad, touchscreen, phone, camera or a mouse.

Preferably the step of collecting rating data involves collating rating data for each of the video clips to provide an aggregated or combined rating curve for comparison. More preferably the method also comprises the step of comparing all or part of the aggregated or combined rating curves for the video clips relevant to the specified topic. Even more preferably the collected rating data is made available at a charge. Still more preferably the method also comprises the step of reviewing part of the video clip can be reviewed by moving to a specific rating time or period on the rating curve.

Preferably the step of presenting the digital content involves presenting the content in a hierarchy depending on the status of the contributor. More preferably the status of the contributor is determined by the level of subscription of the contributor. Even more preferably the status may change depending on rating data collected for the contributor.

According to another aspect of the invention there is provided a method of broadcasting digital content across a communications network, said method comprising the steps of:
  collecting two or more digital content files relevant to a specified topic;
  electronically presenting at least two of the content files alongside one another at a node of the network;
  providing means for reviewing at least one of the presented content files at the network node;
  providing means for real-time rating of the digital content as it is viewed at the network node;
  time-stamping the collected rating data at the network node to coincide with and thus be synchronised within the digital content.

Preferably the step of collecting two or more digital content files involves selecting stimulant video clip and at least one response video clip from a catalogue of video clips relevant to the specified topic. More preferably the step of electronically presenting Involves displaying the selected stimulant and response video clips at a computer connected to the Internet. Even more preferably the method comprises the step of soliciting and presenting the response video clips.

Preferably the step of providing means for real-time rating of the digital content involves the provision of an external peripheral device associated with the computer and operable to allow viewer rating of each of the video clips in real time and at no charge. Generally the peripheral device includes a keyboard, touchpad, touchscreen, or mouse.

According to a further aspect of the invention there is provided a method of presenting digital content across a communications network, said method comprising the steps of:
  collecting at least one digital stimulant file relevant to a specified topic;
  the collected digital stimulant file at one or more websites associated with the network;
  collecting a digital response file relevant to the specified topic;
  collecting a fee for presentation of the digital response file;
  presenting the digital stimulant file and the digital response file on at least one of said one or more websites at a node of the network.

Preferably the step of collecting the digital stimulant file involves selecting a stimulant video clip from a plurality of video clips relevant to the specified topic. More preferably the step of presenting involves displaying at least one of the selected video clips at said websites on the Internet. Even more preferably the step of collecting a digital response file involves soliciting and presenting the video response clip from a catalogue of video clips, provided the fee has been paid. Still more preferably the method also comprises the step of paying said websites a percentage or portion of the fee. Even still more preferably the method also comprises the step of inviting to have the response file presented at other websites provided an additional fee is paid.

Digital content includes but is not limited to video and video clips.

Node includes but is not limited to any device connected to the network and includes a computer, personal digital assistant (PDA), mobile phone, cell phone, or console such as a digital set-top box or video game console.

Communications network includes but is not limited to the Internet.

BRIEF DESCRIPTION OF THE DRAWINGS

In order to achieve a better understanding of the nature of the present invention a preferred embodiment of an on-line method of assessing digital content across a communications network together with methods of broadcasting and presenting digital content across a communications network, will now be described, by way of example only, with reference to the accompanying drawings in which:

FIG. 1 is a schematic representation of digital content in the form of a video clip presented at a computer node of a network together with means for video response clips relevant to the specified topic.

DETAILED DESCRIPTION OF THE PREFERRED EMBODIMENT

In one aspect of the invention as best depicted in FIGS. 1 and 2 there is a method of providing an on-line assessment of digital content, such as video clips 10, across a network, such as the Internet. In general terms the steps involved in this embodiment of the methodology include:
i) presenting a stimulant video clip 10;
ii) providing means for rating the video clip 10 in real time, in this example a rating bar 12 and slider 14 driven by a computer peripheral device (not shown);
iii) collecting rating data relevant to the viewed video clip such as 10.

The stimulant video clip 10 may be either a single video clip or multiple video clips. A video stimulant clip is generally a clip that contains enhancements to improve the response or the video clip is recorded with a specific and conscious formation of structure and content to stimulate or evoke responses. Enhancements include scripting, colour, sound, slides, prompts, different voting prompting, overlays and lots of other multimedia items to increase the focus of the response at set times. The single video clip provides for real time rating of that clip only whereas multiple clips are generally presented as a discussion panel, see FIG. 2.

The video stimulant clip 10 together with (the rating means 12/14) are provided as an embedded software application at a computer connected to the Internet. It is expected that the software application will be downloaded from a central server or portal which controls the presentation and rating of the digital data, typically at no charge to the user of the computer.

Figure 2A:
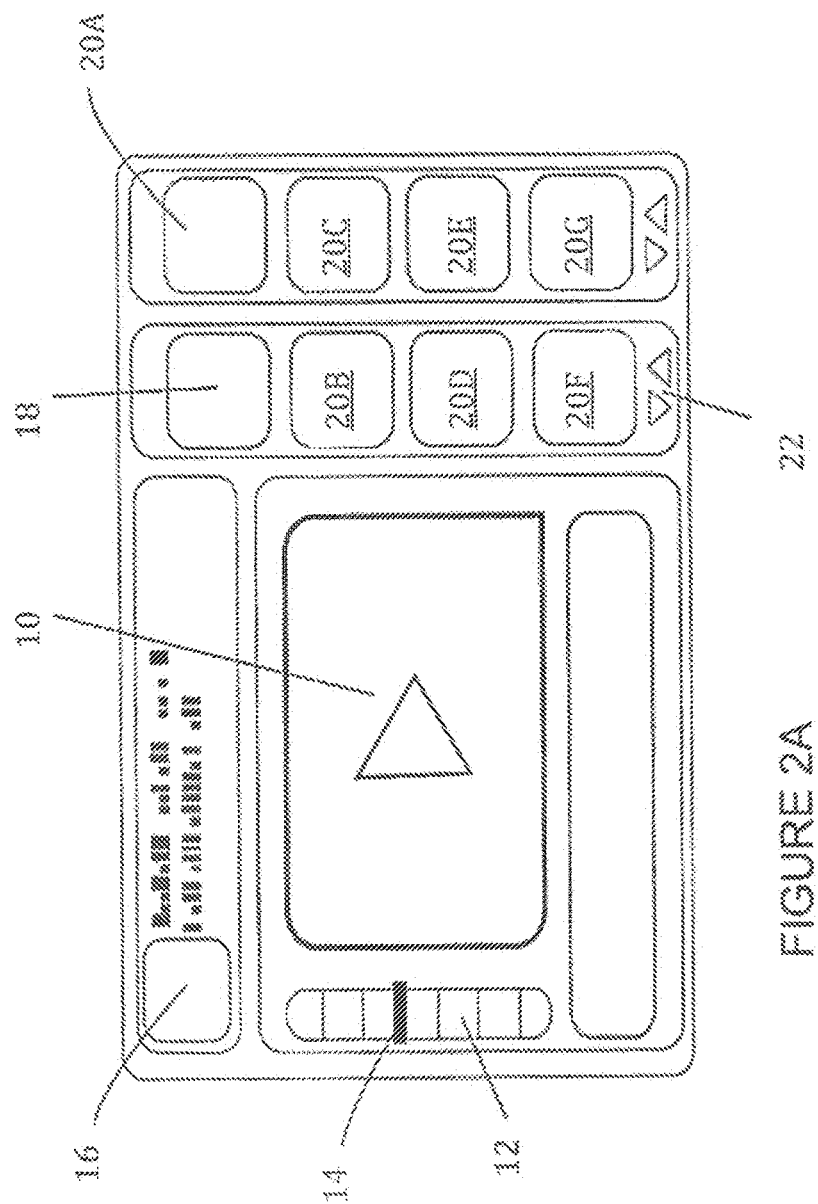
FIGS. 2A and 2B are a schematic representation and a screen shot respectively of the exemplary stimulant video clip of FIG. 1 together with digital or video response clips relevant to the specified topic.
Figure 2B:

As best shown in the exemplary screen shot of FIG. 2B, the stimulant video clip 10 is shown as a thumbnail still image 16 together with a brief descriptor of the specified topic, in this example "Sydney Transportation Network" and the name of the commentator "Barry Jones". The rating bar 12 and slider 14 allow the viewer to rate the video clip 10 along a "cold" to "hot" linear scale. This rating data is collected and time-stamped to coincide and thus be synchronous with the commentary of the video clip 10. That is, the video clip 10 is rated in real-time in the sense that as you view the clip you also rate it. Generally, the viewer can rate the video clip 10 at no charge. The video clip 10 of this embodiment is rated by different and multiple viewers at different times, unlike similar systems where the media is broadcast and voted on by multiple views at the same time.

In another aspect of the invention the video stimulant clip of this example is accompanied by at least one other video clip such as 18. The general steps involved in this method of broadcasting video content across the Internet includes the steps of:
i) collecting two or more digital content files relevant to a specified topic, in this example the video stimulant clip 10 and the video response clip 18 relent to the "Sydney Transportation Network";
ii) electronically presenting these video clips such as 10 and 18 alongside one another at a computer connected to the Internet;
iii) providing means such as the thumbnail clips of the stimulant video clip 16 and the response video clip 18 which if clicked on allows viewing of the relevant video clip; and
iv) providing rating means in the form of the rating bar 12 and slider 14 for rating the selected video clip 10 or 18 in real time whilst it is viewed at the user's computer.

In this embodiment the response video clip 18 is one of multiple response video clips such as 20A to 20G each being relevant to the specified topic "Sydney Transportation Network". The response clips or thumbnails 18 and 20 may be a subset only of numerous other response clips which can be viewed using the scroll keys such as 22. The viewer then clicks on the selected response thumbnail such as 20A which substitutes for the stimulant video clip 10 which by default appears in the relatively large viewing pane. The response video such as 20A can than be rated in real time with the collection of time-stamped data in the same way as the stimulant video 10 is viewed, rated and rating data collected.

In another aspect of the invention the method involves presentation of digital content across a network, such as the Internet, including the steps of:
i) collecting and then presenting the video stimulant clip 10 at one or more websites on the Internet;
ii) collecting one or more video response clips such as 18 and 20 relevant to the specified topic such as "Sydney Transportation Network";
iii) collecting a fee for collection of the response clips 18 and 20; and
iv) presenting the stimulant and response clips 10 and 18/20 respectively on the website at the viewer's computer connected to the Internet.

As illustrated in FIGS. 2A and 2B, the response video clips 18/20 form a catalogue of video clips relevant to the specified topic. The embedded application of this example also includes a toolbar 23 with buttons such as 23A and 23B allowing a user to not only play stimulant or response clips but also to record their own response clip. In this embodiment the central server collects the viewer's response clip and makes their response available by adding it to the catalogue of response clips 18/20 on payment of a fee. The viewer may also be invited to have their response clip presented at other websites together with payment of additional fees. Generally, the website or other websites are paid a percentage or portion of the fees.

In constructing or building the screen shot or discussion panel of FIGS. 2A and 2B a webmaster is provided with a selection screen which enables them to select the stimulant video clip 10 from a library or bank of stimulant or instigator clips provided by a central server. The library of instigator clips is generally provided free of charge and filtered by subject matter to provide content which is relevant to the webmasters line of business. The selection screen may also offer a catalogue of response clips such as 18 and 20 which the webmaster selects to appear on their discussion panel.

The response clips 18/20 may be presented free of charge or at a charge to either the respondent or the webmaster presenting the response clips 18/20. If the respondent is charged for the privilege of having their content presented they must consent to their response clip such as 18 being placed alongside the stimulant clip 10. Alternately the webmaster or website owner may offer to pay for presentation of the respondent's clip such as 18.

Figure 3:
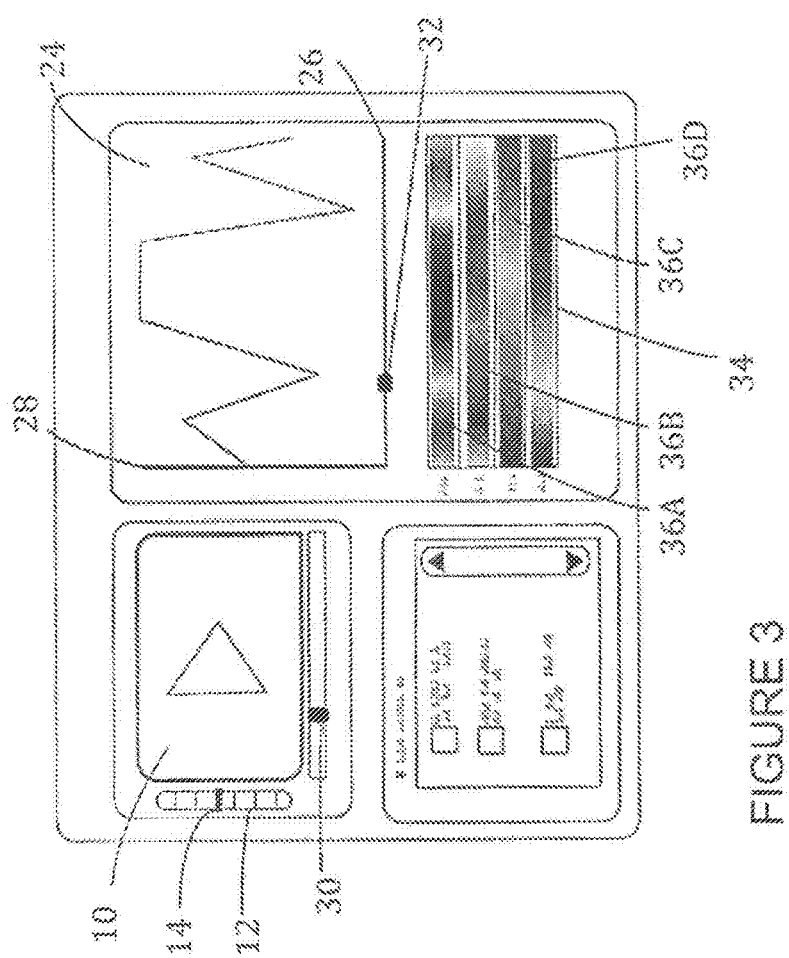
FIG. 3 is a schematic representation of the exemplary video clip of FIGS. 1 and 2 together with rating and other data captured for the video clip.

As shown in FIG. 3, the software application and methodology also involve analysis and display of the rating data collected. In this example the rating curve 24 includes time on the x-axis 26 and an aggregated or combined rating on the y-axis 28. The video clip 10 is shown and synchronised with the rating graph 24 as shown by the respective time indicators 30 and 32. Because the rating data for the individual viewers has already been synchronised with the video clip there is no need to synchronise the rating data for multiple viewers of the same video stimulant. The software thus provides an analytical tool which in its simplest form can be used to provide and review ratings from a stimulant video clip such as 10. The time indicator 32 for the rating curve 24 can be moved back and forth whereby the video clip 10 is automatically taken to the corresponding time indicator 30. In this way, negative, positive and neutral ratings can be interactively assessed in the context of the relevant comments made by the contributor.

The software application of this embodiment also includes another panel 34 showing the current selection of different demographics for the data captured for the video clip 10. For example, the total number of votes displayed are selected from the list of possible demographics including gender, age brackets, geographical information such as state, and other demographic information. This demographic information is summarised in the chart 34 which is aligned with the time axis 26 of the primary rating graph 24. The chart 34 includes separate bars dedicated to the different demographics such as 38A to 38D for comparative purposes. The colour of the respective bars 36 provide an indication of the rating which is derived from the rating axis 28 of the primary rating curve 24.

The video stimulant clip 10 is generally provided by a subscriber or paid up member. The video clip may be tagged by the contributor. The video tag may include tag(s), keyword(s) and/or categories, headings and a description or summary relevant to the subject matter. Subscribers or members can upload stimulant digital clips at any time and these clips go into the library or bank of stimulant clips used by member websites in constructing a discussion panel. Members or subscribers may be automatically informed by email or otherwise of a new stimulant clip or discussion panel relevant to their business. Subscribers to the system have a status which qualifies them as a contributor to the stimulant video clip (as opposed to the response clips) and may also provide them with the privilege of periodic reports derived from the rating data. On the other hand, the video response clips are provided by individuals who have registered by providing limited demographic information without subscribing by payment of fees and thus are not eligible for contribution to the stimulant video or entitled to rating data reports. However, it is possible that the status of a contributor to response clips may be elevated to a higher status, for example contribute to video stimulant clips, based on voting pertaining to their response clip. Individuals may under a pre-paid plan purchase a specified number of uploads for a defined period, for example 20 video uploads per month.

In a preferred form the subscribing site will periodically be provided with a catalogue of stimulant video clips for presentation on their website. The video clips will generally have been filtered so that the subject matter is relevant to their line of business. This filtering may for example be performed using a search engine which provides the subscribing member with only those video clips containing specific information. It is expected that the webmaster for the subscribing member will then be responsible for selection of the relevant stimulant video clip and a side or library of response clips for posting on their website.

Figure 4:
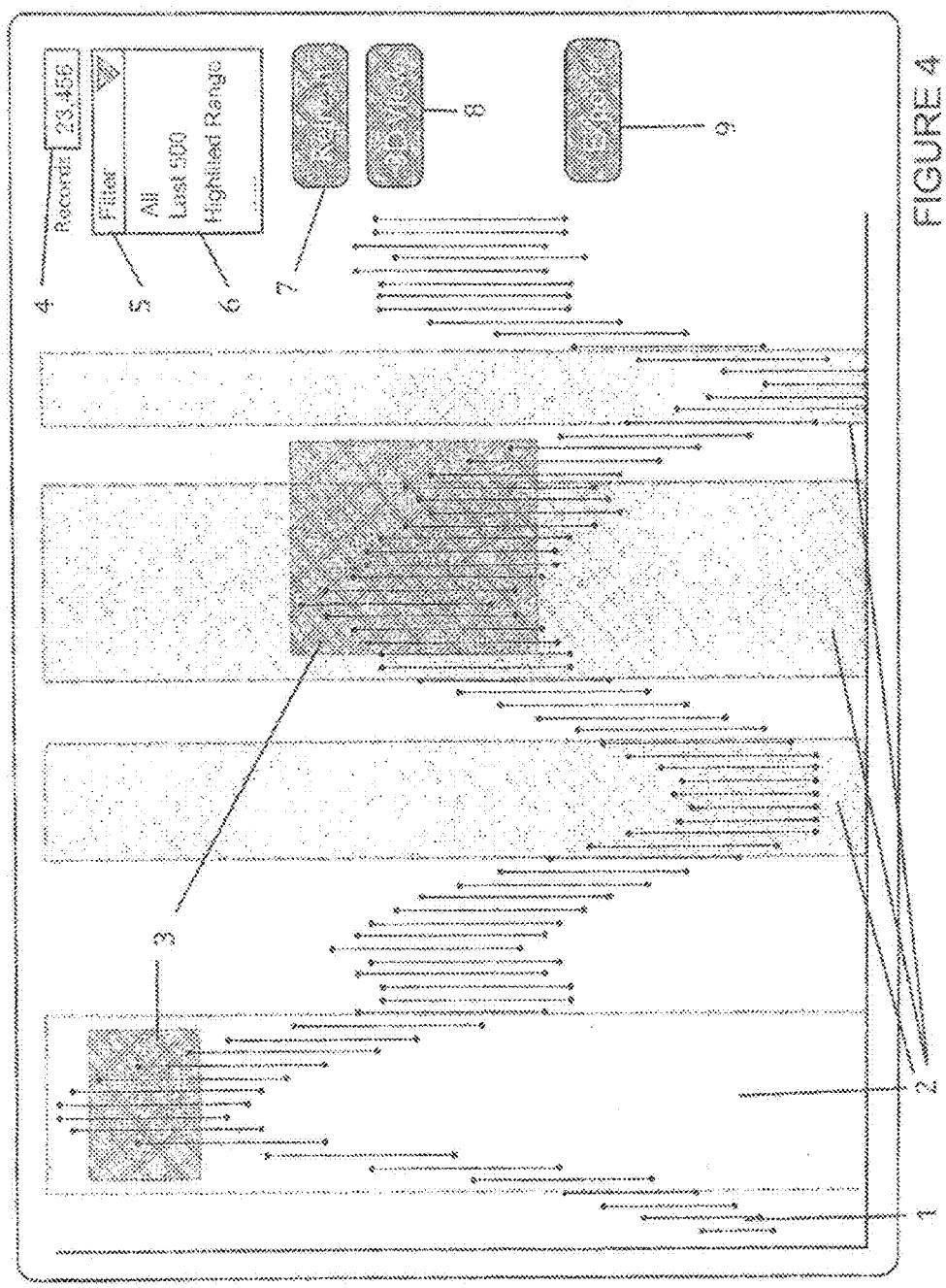
FIG. 4 is a sample screen display of multiple vote analysis shown in two (2) dimensions.

FIG. 4 is an exemplary screen display of response data for a video stimulant clip such as that described in the preceding paragraphs. This display allows for focusing on the different votes for a given stimulus. The numbers in circles each represent the following:

1. shows the ranges of votes for the particular time item with a high and low mark.
2. shows sections of times that have been tagged with values to make easier identification with key stimulus points in the stimulus where most activity may happen based upon the way the stimulus has been constructed.
3. selection tool to allow the selection of an area that can have a filter applied to give a new selection of votes allowing focusing down to a specific level of votes and the changes in the most of the vote summary.
4. displays the current number of records that are being used in the display.
5. allows the selection of different filters to allow the selection of records that meet different criteria.
6. lists the filters that can be used. This may be based on when the vote was taken, demographic information that may cover location, age, sex, and other information that may have been gathered from other information as part of the stimulus activities from other sources covering other video clips, other databases.
7. refresh allows the reloading of the data based upon the filters selected.
8. convert the display to be a 3D view, which allows the viewing of the votes as single lines allowing sorting to be applied and different highlighting methods.
9. export allows the export of the select list of records in different formats, which may include summary data, detailed vote data pints, email addresses and other demographic data that has been captured.

Figure 5:
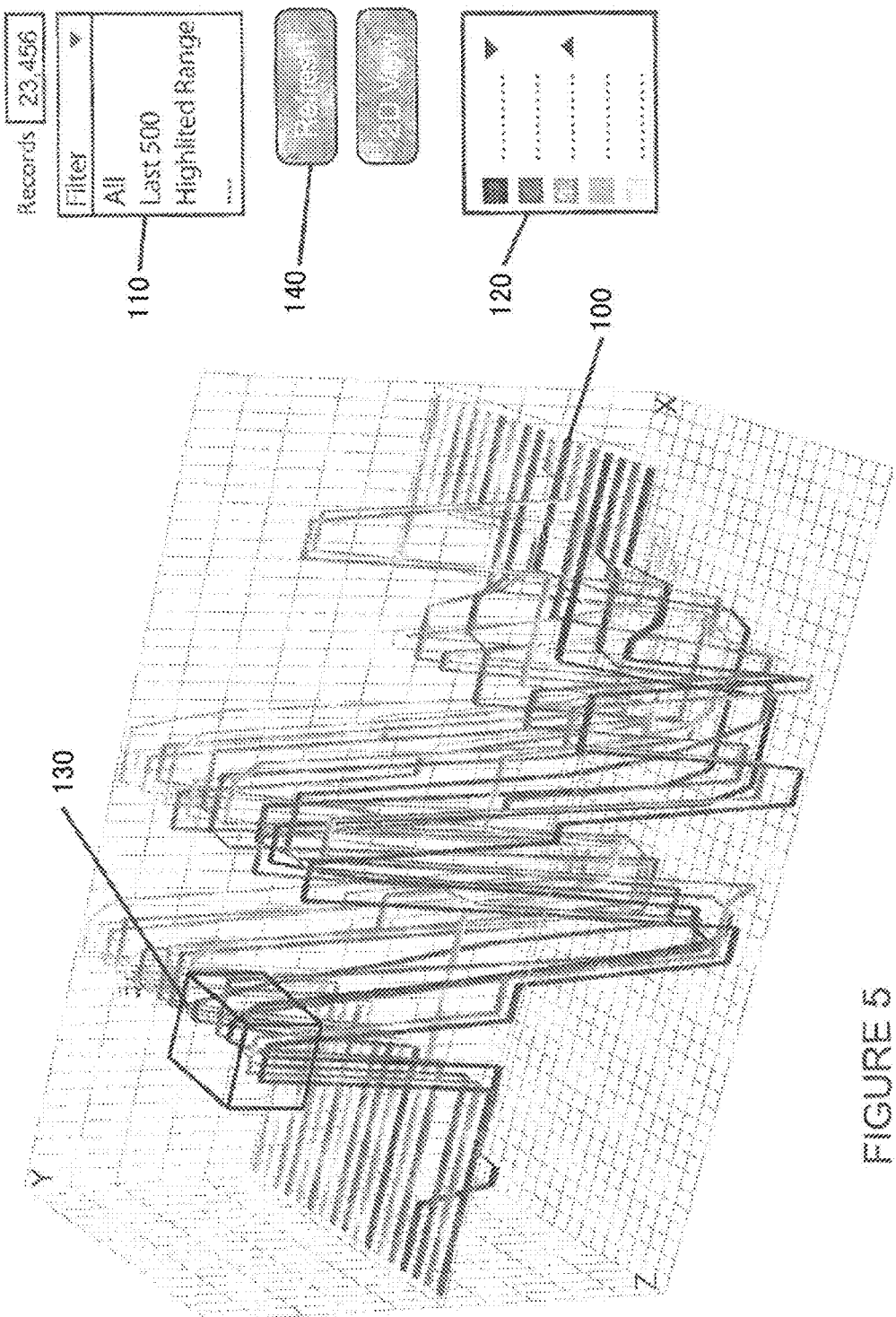
FIG. 5 is a sample screen display of multiple vote analysis from FIG. 4 but with a third (z) dimension.

FIG. 5 shows the 3rd "Z" dimension of the screen display of FIG. 4. The circled numbers for this display represent the following:

100. separate graphs representing each vote in Z-axis.
110. lists the filters that can be used (similar to the filters list of the 2D view).
120. colour markers that represent common demographic details and allows sorting of the Z-axis using the up/down arrow to move each group.
130. 3D zoom selector that is resizable and allows the selection of a group of data points. Multiple boxes can be created.
140. refresh is activated to reselect the views in the range.

In addition to those graphical display features it will be appreciated that response data from a single video clip can be utilised or "mined" to:

(i) cross-reference voting with the particular time-based and marked stimulant or digital content;
(ii) group responses to identify commonality in identifying "crowds" of respondents having similar responses to the stimulant clip.

The cross-referencing in i) provides context-based analysis for attitude and opinion derived from time and positional "triggers" in, for example, the video clip. The "crowding" of respondents in ii) is effected by matching respondents having similar fingerprints.

Now that a preferred embodiment of the present invention has been described in some detail it will be apparent to those skilled in the art that the on-line method of assessing digital content across a network together with the other aspects of the invention have at least the following advantages:

i) viewers are able to rate digital content such as video clips in real time whilst the video is viewed on-line across a network;
ii) individuals are able to contribute to discussion and debate by uploading their own video response clips;
iii) the presentation of digital response flies, such as response video clips, requires payment of a fee and thus generates revenue; and
iv) the software application provides rating data synchronised with the relevant video clip.

Those skilled in the art will appreciate that the invention described herein is susceptible to variations and modifications other than these specifically described. For example, the software application may include the stimulant video clip together with a commentator's video clip which together generate response video clips. The rating data may be mined and presented different to the graphs and information provided but still remain within the scope of the invention. It should also be understood that the digital content is not restricted to video but may also extend to digital audio or other files.

All such variations and modifications are to be considered within the ambit of the present invention and nature of which is to be determined from foregoing description.

We claim:

1. An on-line method of assessing digital content across a communications network, said method comprising the steps of:
   presenting digital content at one or more network nodes of the communications network;
   real-time rating of the digital content as it is presented at each network node of the one or more nodes of the communications network;
   simultaneously collecting rating data from multiple users of the one or more network nodes relevant to the presented digital content,
   time-stamping the collected rating data from each said user of the multiple users at the respective one or more network nodes to coincide with the presented digital content; and
   collating the collected and time-stamped rating data to provide a real-time aggregated or combined rating curve for the multiple users of the presented digital content, wherein said rating data of each user of the multiple users is individually synchronized with the presented digital content, when the presented digital content from the multiple users are the same,
   wherein the rating curve graphically indicates a range of the rating data for the multiple users at a particular time of the presented digital content.

2. The on-line method as defined in claim 1, wherein the step of presenting digital content involves presenting two or more video clips relevant to a specified topic at a computer connected to the Internet.

3. The on-line method as defined in claim 1, wherein the step of presenting digital content involves presenting a single video clip only.

4. The on-line method as defined in claim 1, wherein the step of real-time rating of the digital content involves the provision of an external peripheral device associated with a computer at each network node and operable to allow rating of the digital content in real time and at no charge.

5. The on-line method as defined in claim 3, wherein the status of a contributor is determined by a level of subscription of the contributor or changes depending on rating data collected for the contributor.

6. The on-line method as defined in claim 1, also comprising the step of assessing part of the presented digital content by moving to a specific rating time or period on the rating curve which is synchronized with the presented digital content.

7. The on-line method as defined in claim 1, wherein the step of presenting the digital content involves presenting the content in a hierarchy depending on a status of a contributor.

8. The on-line method as defined in claim 1, wherein the digital content contains enhancements to stimulate response at set times, wherein the enhancements include an audio or visual effect.

9. An on-line method of assessing digital content across a communications network, said method comprising the steps of:
   presenting digital content at one or more network nodes of the communications network;
   real-time rating of the digital content as it is presented at each network node of the one or more nodes of the communications network;
   collecting rating data from multiple users of the one or more network nodes relevant to the presented digital content;
   time-stamping the collected rating data from each user of the multiple users at the respective one or more network nodes to coincide with the presented digital content;
   collating the collected and time-stamped rating data to provide a real-time aggregate or combined rating curve for the multiple users of the presented digital content, wherein the rating data of each user of the multiple users is individually synchronized with the presented digital content, when the presented digital content from the multiple users are the same; and
   transmitting periodic reports to a contributor, the periodic reports being derived from the rating data.

10. The on-line method as defined in claim 9, wherein the step of presenting digital content involves presenting two or more video clips relevant to a specified topic at a computer connected to the Internet.

11. The on-line method as defined in claim 9, wherein the step of presenting digital content involves presenting a single video clip only.

12. The on-line method as defined in claim 9, wherein the step of real-time rating of the digital content involves the provision of an external peripheral device associated with a computer at each network node and operable to allow rating of the digital content in real time and at no charge.

13. The on-line method as defined in claim 9, wherein the step of presenting the digital content involves presenting the content in a hierarchy depending on a status of the contributor.

14. The on-line method as defined in claim 13, wherein the status of the contributor is determined by a level of subscription of the contributor or changes depending on rating data collected for the contributor.

15. The on-line method as defined in claim 9, further comprising:

assessing part of the presented digital content by moving to a specific rating time or period on the rating curve which is synchronized with the presented digital content.

16. A method of broadcasting digital content across a communications network, said method comprising the steps of:
    collecting two or more digital content files relevant to a specific topic;
    electronically presenting at least two of the digital content files alongside one another at one or more network nodes of the communications network;
    reviewing at least one of the presented digital content files as it is presented at each network node of the one or more nodes of the communications network;
    real-time rating of the digital content as it is viewed at each network node of the one or more nodes of the network;
    collecting rating data from multiple viewers of the one or more network nodes relevant to the presented digital content;
    time-stamping the collected rating data from each viewer of the multiple viewers at the respective one or more network nodes to coincide with the presented digital content; and
    collating the collected and time-stamped rating data to provide an aggregated or combined rating curve for the multiple viewers of the presented digital content, wherein said rating data of each viewer of the multiple viewers is individually synchronized with the presented digital content, when the presented digital content from the multiple viewers are the same,
    wherein the rating curve graphically indicates a range of the rating data for the multiple viewers at a particular time of the presented digital content.

17. The method as defined in claim 16, wherein the step of collecting two or more digital content files involves selecting a stimulant video clip and at least one response video clip from a catalogue of video clips relevant to the specified topic.

18. The method as defined in claim 17, wherein the step of electronically presenting digital content involves displaying the selected stimulant and response video clips at a computer connected to the Internet.

19. The method as defined in claim 17, further comprising the step of soliciting and presenting the response video clips.

20. The method as defined in claim 17, wherein the step of real-time rating of the digital content involves the provision of an external peripheral device associated with a computer at each network node and operable to allow rating of each of the video clips in real time and at no charge.

* * * * *